March 25, 1941. G. L. MOORE 2,235,897
LUBRICATOR
Filed Feb. 3, 1938
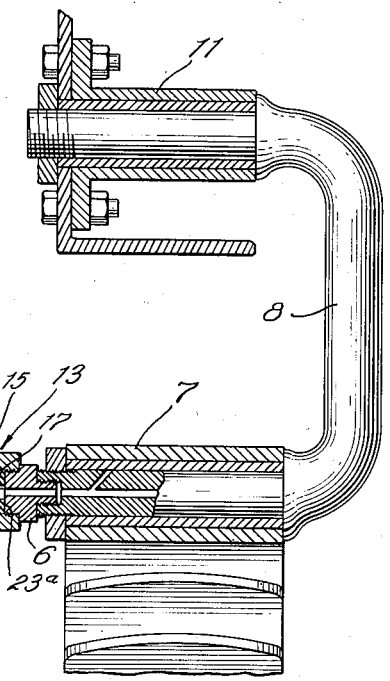
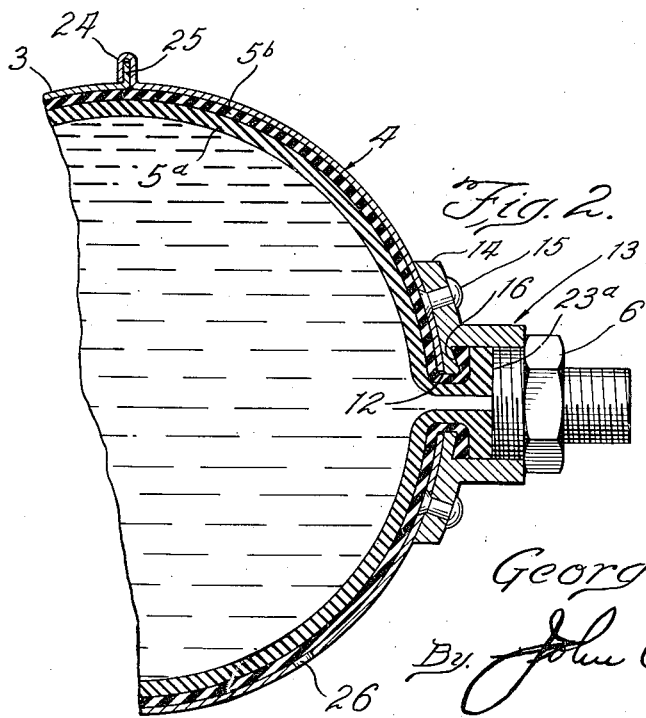
Inventor:
George L. Moore.
By John A. Watson
Atty.

Patented Mar. 25, 1941

2,235,897

UNITED STATES PATENT OFFICE 2,235,897

LUBRICATOR

George L. Moore, Chicago, Ill.

Application February 3, 1938, Serial No. 188,529

6 Claims. (Cl. 184—105)

The invention relates to lubricators of the reservoir type which may be loaded or filled with a substantial charge of lubricant for gradual delivery to a bearing or the like over a substantial period of time. More particularly, the invention has to do with the reservoir type lubricator in which the lubricant charge is placed in and held in the reservoir under pressure and fed by that pressure to the place to be lubricated. The reservoir hereinafter disclosed may be used as a substitute for the reservoir in the lubricator mechanism of my copending application Ser. #128,962 filed March 4, 1937.

One of the primary objects of the invention is to provide a reservoir lubricator which will hold a substantial quantity of lubricant, which will maintain the lubricant under a reasonable pressure, and which will offer no impedance to the pressure exerted within the lubricator to effect discharge of the lubricant other than the internal friction of the lubricant and the resistance of the bearing or the like with which the lubricator may be connected.

Another object is to provide an efficient, simple and economical type of pressure producing element which will eliminate all frictional resistance offered by piston types of pressure producing means.

A further object is to provide a lubricator of such construction that air may be used in conjunction with an expansible elastic member within a substantially air tight shell for the development of reasonable pressures upon lubricant to feed the same to a bearing.

A still further object is to provide a lubricator element in the nature of an expansible or dilatable member composed of rubber, preferably oil resistant such as the artificial rubbers well known upon the market and one of which is known under the trade name of "duprene," and so formed that it may be expanded or dilated by the oil or other lubricant which it is to contain and dispense, the inherent elasticity of the element serving to permit the dilation or expansion without rupture and to exert a substantially continuous pressure on the lubricant to effect discharge thereof.

Many other objects as well as the advantages and uses of the invention as well as variations thereof will be apparent to those skilled in the art after reading the following description and claims and after viewing the drawing in which:

Fig. 1 is a view in section on a diametric plane through a lubricator constructed in accordance with a preferred form of the invention and showing the same applied to shackle bearings of an automobile, and Fig. 2 is a fragmentary sectional view of a somewhat modified construction taken along a plane corresponding to the plane of the view of Fig. 1.

The lubricator shown in Fig. 1 comprises, in general, a hollow spherical steel or other metal shell formed in two parts or hemispheres 3 and 4 each of which may be provided with an equatorial outwardly flaring flange by which the parts may be secured together, a somewhat spool-shaped and tubular element 5 of elastic material such as the artificial rubber known as "duprene," a connection nipple 6 for securing the lubricator to a bearing member such as the bearing 7 of shackle 8, and a lubricant supply nipple or fitting 9 of any suitable character. A similar lubricator may be attached to the other bearing 11 of the shackle 8.

Each of hemispherical parts 3 and 4 of the shell may be provided with an aperture 12 about which an internally threaded gland-like member 13 may be disposed. A circumferential flange 14 on the base of member 13 preferably conforms to the shell and is secured to the shell by means of rivets or the like 15 which may pass through the flange and the shell part 3 or 4. Suitable sealing compound or gaskets may be disposed between the circumferential flanges 14 and the shell and around the rivets to make an air tight connection if such be desired. Internally at its bottom, each member 13 may be recessed to provide a circular groove 16 for the reception of one of the enlarged ends 17 of the element 5. The lubricant receiving nipple or fitting 9 has a threaded shank 18 adapted to engage the threads of the member 13 which is on shell part 3, a head 19 for contact or coupling engagement with the delivery nozzle of a lubricant gun, and a one-way check valve 21 backed by a spring, normally closing the passageway through the nipple against egress of lubricant.

The element 5 may be composed wholly of rubber, or, of rubber reenforced with fabric or the like provided the fabric is utilized in such manner as not to interfere with the expansion and contraction of the element, or, it may be composed of an inner layer of an expansible and contractible material which is oil resistant and oil impervious but of poor elastic quality combined with an outer layer of rubber or similar material having a relatively high coefficient of elasticity but, perhaps, of low oil resistance. In Fig. 1, the element is illustrated as being composed of a single thickness of "duprene" while in Fig. 2, there are two layers 5a and 5b of which the inner layer 5a may be composed of any distensible material having a relatively low coefficient of elasticity but of high oil resistance and of which the outer layer 5b may be composed of rubber. Of course, it may be desirable to vulcanize the several layers together.

The elements 5 and 5a—5b may be formed in any suitable manner as by molding and each of those illustrated is formed as a spool-shaped tube having a passageway 22 extending from end to end thereof. Each end 17 is enlarged or flanged as best illustrated in Fig. 2, and preferably in such manner as to conform to the groove 16 circumferentially thereof at one side of the flange or enlargement. The other sides or end surfaces 23 and 23a may be flat since either a substantially flat surface on the nipple 9 or on the nipple 6 is to lie or press thereagainst for the purpose of securely clamping the element flanges against the bottoms of the grooves and against pulling out as distention of the elements occurs.

The shell halves are connected together, in the embodiments illustrated, by equatorial flanges 24, 25, previously mentioned. One of these flanges is made radially longer, i. e. wider, than the other so that it may be spun or seamed therearound to effect a tight joint, a sealing compound or a gasket previously having been placed in the joint if the same is to be made air tight. The lubricator shell of Fig. 1 is intended to be made air tight for the purpose of trapping and compressing air therein whereas in Fig. 2, a small breather aperture 26 through the shell is indicated to exemplify a shell which is not air tight. If the shell is made air tight the expansion of element 5, or element 5a—5b as the case may be, will compress the air within the shell with a corresponding reduction in its volume as indicated by dotted line positions of the element wall in Fig. 1.

If the shell be apertured as at 26, the air may flow out as the element expands and may flow in as the element contracts and the limit of expansion of the element is reached when the element walls engage the shell walls. If the aperture or orifice be made small enough or if it be restricted in some other manner, certain purposes may be served thereby. For instance, if the expansible lubricant containing element 5 be put under an instantaneous pressure during a filling operation, the air trapped within the shell, being unable to escape rapidly through the small orifice, builds up resistance and the pressure on the lubricant serves to force the lubricant into and through the bearing. In this manner a dirty bearing may be flushed or a tight bearing flooded. In the lubricator of Fig. 1, the same result may be accomplished by sufficient compression of the air therein.

While it is believed that the operation of filling the lubricator as well as the manner by which it serves to feed lubricant to a bearing will be apparent from the foregoing, nevertheless they will be briefly reviewed. When an oil gun nozzle is pressed against or clamped to the fitting to effect a tight seal therewith, lubricant may be forced past the check valve 21 and into the passageway 22 in element 5. If the bearing clearances are proper and usual, a back-pressure on the lubricant will cause the element to dilate or expand (as indicated in dotted lines) until the resistance offered by the elasticity or tension of the element or the tension of the element plus the pressure on the air compressed in the shell or the engagement of the element with shell walls, equals the back pressure from the bearing from which point any additional lubricant forced into the lubricator will flow through the bearing. After the lubricator has been filled, the effort of the element walls to restore themselves to a collapsed or normal condition, with or without the assistance of compressed air, will gradually feed lubricant under pressure to the bearing surfaces over a substantial period of time, assuming the bearing clearance is not excessive. In those cases where the bearing is worn or for other reasons the clearances are large, the addition of a metering or restricting device such as that of the aforementioned copending application or a thermostatically controlled or a pressure controlled regulator of other suitable character, may be utilized.

The elements 5 and 5a—5b have been illustrated and described as of tubular spool shape but, of course, their shape, composition and construction may be varied considerably. Under some circumstances the expansible element may be somewhat bulbous, it may be secured only by one end to the shell, it may have a relatively minute passageway leading to its interior, it may have a passageway which does not pass clear through it, and it may be constructed in many other ways. The lubricator construction may be such that the nipple 9 is connected to the outlet passageway from the element 5 and that passageway made to serve the dual function of inlet passageway for lubricant fed to the element and an outlet passageway for the lubricant flowing from the element to a bearing in which case the passageway in the element need not extend completely through the same.

Although only two embodiments of the invention have been illustrated and described in detail it will be apparent that the invention is of broader application and is susceptible of many other embodiments and numerous adaptations. Consequently it is desired that the invention be considered as governed only by its spirit and the scope of the appended claims.

I claim:

1. In a lubricator, a dilatable member of elastic material such as rubber and the like having a passageway therein and adapted to receive lubricant within and to discharge lubricant from said passageway, said passageway serving as a reservoir, means for securing said member to a bearing in lubricant feeding relation thereto, and means including a check valve providing a lubricant supply duct connected with said passageway for engagement by a lubricant supply nozzle whereby to fill said passageway.

2. In a lubricator, a dilatable reservoir member of elastic material such as rubber and the like, said member having a dilatable passageway in the interior thereof and a passageway for the supply of lubricant to said interior, a relatively rigid shell surrounding portions of said member and in spaced relation thereto whereby to limit the distention of said members, and a lubricant supply nipple secured to said shell with the duct of the nipple in communication with said passageway, said nipple including a check valve whereby to prevent lubricant from flowing out of the nipple from said passageway.

3. In a lubricator, a substantially spool shaped tubular member forming a lubricant reservoir and having a flange at each end, said member being composed of a substantially elastic material, a relatively rigid shell about said member, means for securing said flanges at a substantially fixed distance from one another, said member being confined between said flanges and within said shell, and inlet means having a check valve for supplying lubricant to the interior of said member.

4. In a lubricator, a substantially rigid shell substantially sealed against egress of air, a dilatable lubricant reservoir member of elastic material disposed within said shell, said member having a hollow interior for the reception of lubricant, there being a passageway connecting the hollow interior of said member with a place exterior of said shell, and means including a check valve for feeding lubricant into said hollow interior of said member.

5. In a lubricator, a substantially rigid shell adapted to contain a fluid under pressure, a dilatable lubricant reservoir member of resilient material substantially permanently disposed within said shell and normally in spaced relation to a part of the interior wall surface thereof, said member being imperforate within said shell and having an internal passageway communicating through an inlet and an outlet with the exterior of said shell and being capable of a relatively large number of successive dilations and contractions, and valve means for preventing flow outwardly from said passageway through said inlet.

6. In a lubricator, means providing a substantially rigid shell, said shell having an aperture through a wall thereof for ingress and egress of air, an expansible lubricant reservoir member of elastic material disposed within said shell and having a lubricant receiving passageway to the interior thereof and an outlet passageway from said interior, said passageways communicating with the exterior of said shell, and a check valve for precluding the exit of lubricant through said receiving passageway.

GEORGE L. MOORE.